(12) United States Patent
Moad et al.

(10) Patent No.: US 8,569,441 B2
(45) Date of Patent: *Oct. 29, 2013

(54) PROCESS FOR TRANSFORMING THE END GROUPS OF POLYMERS

(75) Inventors: Graeme Moad, Sassafras (AU); San Hoa Thang, Camberwell (AU); Ezio Rizzardo, Wheelers Hill (AU)

(73) Assignee: Commonwealth Scientific and Industrial Research Organisation, Campbell Australian Capital Territory (AU)

( * ) Notice: Subject to any disclaimer, the term of this patent is extended or adjusted under 35 U.S.C. 154(b) by 370 days.

This patent is subject to a terminal disclaimer.

(21) Appl. No.: 12/528,249

(22) PCT Filed: Feb. 23, 2007

(86) PCT No.: PCT/US2007/004702
§ 371 (c)(1),
(2), (4) Date: Feb. 4, 2010

(87) PCT Pub. No.: WO2008/103144
PCT Pub. Date: Aug. 28, 2008

(65) Prior Publication Data
US 2010/0137548 A1     Jun. 3, 2010

(51) Int. Cl.
*C08G 18/10*     (2006.01)
*C08G 75/00*     (2006.01)
*C08J 3/00*      (2006.01)

(52) U.S. Cl.
USPC .............................. 528/75; 528/360; 528/480

(58) Field of Classification Search
USPC ........................................... 528/480, 360, 75
See application file for complete search history.

(56) References Cited

U.S. PATENT DOCUMENTS

| | | | |
|---|---|---|---|
| 4,314,001 A * | 2/1982 | Wesseler | 428/393 |
| 7,012,119 B2 | 3/2006 | Charmot et al. | |
| 2004/0171765 A1 | 9/2004 | Tsuji et al. | |
| 2009/0220607 A1 * | 9/2009 | Kiser et al. | 424/487 |

FOREIGN PATENT DOCUMENTS

| | | |
|---|---|---|
| WO | WO 02/090397 A | 11/2002 |
| WO | WO 2005/113612 A | 12/2002 |
| WO | WO 2005/061555 A | 7/2005 |
| WO | WO2005/113612 | * 12/2005 |
| WO | WO 2007/100719 A | 9/2007 |

OTHER PUBLICATIONS

Zhang, Allyl functionalizd telechelic linear polymer and star polymer via RAFT polymerization, 2006, polymer 47, 5259-5266.*
Zhao, Synthesis of Well-Defined Homopolymer and Diblock Copolymer grafted into Silica Particles by Z-Supported RAFT Polymerization, 2006, Marcomolecules, 39, 8603-8608.*
Zhao Youliang, et al: "Synthesis of Well-Defined Homopolymer and Diblock Copolymer Grafted Onto Silica Particles by Z-Supported Raft Polymerization," Macromolecules; Macromolecules. Dec. 12, 2006, vol. 39, No. 25, pp. 8603-8608.
Chong Bill,et al. "Thermolysis of RAFT-Synthesized Poly(Methylmethacrylate)" Aust. J. Chem; Australian Journal of Chemistry 2006; vol. 59, No. 10, 2006, pp. 755-762.
Moad Grame, et al. "Advances in RAFT Polymerization: The Synthesis of Polymers With Defined End-Groups." Polymer; Polymer, Sep. 8, 2005, vol. 46. No. 19, SPEC. ISS., pp. 8458-8468.
Zhang, et al: "Allyl Functionalized Telechelic Linear Polymer and Star Polymer Via RAFT Polymerization" Polymer, Elsevier, Oxford, GB, vol. 47, No. 15, Jul. 12, 2006. pp. 5259-5266.
Patton D L et al: "A Facile Synthesis Route to Thiol-Functionalized Alpha, Omega-Telechelic Polymers Via Reversible Addition Fragmentation Chain Transfer Polymerization" Macromolecules, ACS, Washington, DC, US, vol. 38, 2005,. pp. 8579-8602.

* cited by examiner

*Primary Examiner* — Ling Choi
*Assistant Examiner* — Monique Peets
(74) *Attorney, Agent, or Firm* — Arent Fox LLP

(57) ABSTRACT

The present invention is directed to a process for the cleavage of one or more starting polymers having thiocarbonylthio groups of the formula (I) into derived polymers in which the —S—(C=S)— group is transformed. The process includes contacting the starting polymer containing groups $Y_b$ with one or more reagents containing groups $X_a$ to produce the derived polymer and a byproduct containing the groups $Y_b$, wherein the groups $X_a$ is one or more reactive groups and the groups $Y_b$ is an extracting group and a byproduct, which is then separated from the derived polymer by conventional separation processes. The derived polymer is free from odor or color that is sometimes associated with the starting polymer and it can be used in making optical lenses, such as high refractive index spectacle lenses.

36 Claims, No Drawings

PROCESS FOR TRANSFORMING THE END GROUPS OF POLYMERS

CROSS-REFERENCE TO RELATED APPLICATION

This application is a National Stage entry of International Application No. PCT/US2007/004702, filed Feb. 23, 2007, the disclosure of the prior application is hereby incorporated in its entirety by reference.

FIELD OF INVENTION

This invention provides a process for the transformation of polymers formed by RAFT polymerization and other polymers containing thiocarbonylthio groups of the formula —S—(C=S)—.

BACKGROUND OF INVENTION

Polymers containing thiocarbonylthio groups can be colored, the color depending on the absorption spectrum of the thiocarbonylthio chromophore. Such polymers can also be odorous or release an odor over time due to decomposition of the thiocarbonylthio groups. The presence of such color and odor can be disadvantageous. In some circumstances, it may also be necessary to deactivate thiocarbonylthio groups because of their reactivity or to transform them for use in subsequent processing into conventional applications, such as coating compositions.

For certain applications, it is desirable to have polymers possessing thiol functionality. These applications include the use of bis- or multithiols in the synthesis of condensation polymers such as polythiourethanes and polythioesters or polymers containing disulfide linkages. Polymeric thiols can also be used as transfer agents in free radical polymerization to form block or segmented copolymers.

Thiol functionality can also be used to form crosslinks in network polymers and microgels and to form conjugates to biological polymers, such as proteins.

Other applications of thiol-functional polymers relate to the property of thiols to complex metals, such as gold and cadmium. Thus, it is possible to use thiol-functional polymers to form nanoparticles encapsulating these metals. It is also possible to use such polymers as metal sequestering agents.

It is well known that thiocarbonylthio groups can be transformed into thiols by reaction with certain nucleophiles which include primary and secondary amines, ammonia, other thiols, and hydroxide. They can also be reduced to thiols with reducing agents such as sodium borohydride, lithium aluminum hydride or zinc in acetic acid. These and similar reactions of thiocarbonylthio groups in small molecules are reviewed by Kato and Ischida in Sulfur Reports, 1988, 8, 155 and by Mayer and Scheithauer in Houben-Weyl Methods of Organic Chemistry, volume E, p 891 (1985). Examples, of aminolysis of a thiocarbonylthio group from a polymer to leave thiol functionality are provided in Makromol. Chem. 1982, 182, 2383.

Polymers formed by RAFT polymerization contain thiocarbonylthio groups either at the chain ends or within the chain. In WO9801478A1, in which RAFT polymerization using thiocarbonylthio transfer agents is first disclosed by Le et al., it is also disclosed that polymers formed by RAFT polymerization are susceptible to this chemistry. The potential of this chemistry to cleave end groups and decolorize polymers and produce a polymer with a thiol end group is cited in by Chiefari et al. in Macromolecules 1998, 31, 5559.

In Macromolecules 2000, 33, 244, it is demonstrated that the poly(methyl acrylate) prepared with a trithiocarbonate RAFT agent can be cleanly cleaved by treatment with ethylenediamine.

Application US20040171765A1 assigned to Kaneka Corporation claims treatment of a polymer with thiocarbonylthio chain ends with a compound selected from ammonia, hydrazine, primary amine compounds, and secondary amine compounds to form a polymer with thiol chain ends which is used as a precursor to a polythiourethane. The treatment agent was preferred to be low boiling (<100°), for example, ethylamine, or a hindered amine light stabilizer.

U.S. Pat. No. 6,794,486 assigned to Rhodia discloses the treatment of a polymer with a dithio group at the chain end with an amine not triethanolamine in an organic solvent to decolorize the polymer and remove end groups. The example amine provided is ammonium hydroxide. It is also suggested that many amine compounds can react with functionality in the polymers such as poly(acrylate esters) and polyvinyl acetate) to give undesired side products. The end groups formed by removal of the dithio end group are not defined.

In other circumstances it is desirable of completely remove sulfur from the polymer.

In U.S. Pat. No. 6,919,409 assigned to Dupont and CSIRO a process is disclosed for replacing a thiocarbonylthio group with hydrogen by contacting the polymer with a source of free radicals and hypophosphite salt.

U.S. Pat. No. 7,012,119 assigned to Symyx discloses a process for substituting a thio group (a thiocarbonylthio group) with a functional group that is not hydrogen by contacting, the polymer with a source of free radicals and an addition fragmentation agent.

In Macromolecules 2005, 38, 5371-5374, a method for removing a thiocarbonylthio group based on thermal elimination to provide a polymer with an unsaturated end group is described.

In WO0506155 assigned to the University of Leeds a process for synthesis of polymers attached to a polymeric support is described. A process removing thiocarbonylthio groups based on heating a polymer containing thiocarbonylthio groups with a very large excess of a radical initiator and isolating a pure polymer is also disclosed. Because of the very large excess of a radical initiator utilized this process creates other byproduct issues and appears not to be completely effective with some polymers (for example polystyrene).

The by-products formed by cleaving a thiocarbonylthio end group to form a thiol end group by the processes described can themselves be colored or odorous. They may also interfere with subsequent processing steps or the intended application. They can also be difficult to separate from the polymer. Thus a new process is required which cleanly produces thiol end groups from a starting polymer with thiocarbonylthio end groups and which provide byproducts which can be conveniently separated from the derived polymer.

STATEMENT OF INVENTION

The present invention is directed to a process for removing one or more groups of the formula —S—(C=S)—Z$\sim\sim\sim$Y$_b$, [—S—(C=S)]$_m$—Z$^1$$\sim\sim\sim$Y$_b$, —S—(C=S)—S—R"$\sim\sim\sim$Y$_b$ or [—S—(C=S)—S]$_n$—R'$\sim\sim\sim$Y$_b$ from a starting polymer, which is in the form of a melt, a solution, dispersion, or a combination thereof, said process comprising:

contacting said starting polymer containing groups $Y_b$ with one or more reagents containing groups $X_a$ to produce a derived polymer and a byproduct containing said groups $Y_b$, wherein said groups $X_a$ is one or more reactive groups and said groups $Y_b$ is an extracting group and wherein said a ranges from 1 to 30 and said b is 1 or 2, wherein:

Z is selected from the group consisting of unsubstituted or substituted alkyl, $C_6$ to $C_{18}$ unsubstituted or substituted aryl, unsubstituted or substituted heterocyclic ring, unsubstituted or substituted $C_1$ to $C_{18}$ alkylthio, SR, unsubstituted or substituted arylthio, unsubstituted or substituted $C_1$ to $C_{18}$ alkoxy, unsubstituted or substituted aryloxy, unsubstituted or substituted amino, unsubstituted or substituted $C_1$ to $C_{18}$ alkoxycarbonyl, unsubstituted or substituted aryloxycarbonyl, carboxy, unsubstituted or substituted $C_1$ to $C_{18}$ acyloxy, unsubstituted or substituted aroyloxy, unsubstituted or substituted carbamoyl, $C_2$, to $C_{18}$ dialkyl-phosphonato, diarylphosphonato, $C_1$ to $C_{18}$ dialkyl-phosphinato, diaryl-phosphinato, $C_1$-$C_{22}$ trialkoxysilyl, $C_1$-$C_{22}$ trialkylsilyl and a second polymer chain having a number average degree of polymerization in the range of 5 to 1000;

$Z^1$ is an m-valent moiety derived from a species selected from the group consisting of unsubstituted or substituted alkyl; unsubstituted or substituted aryl and a third polymer chain having a number average degree of polymerization in the range of 5 to 1000 wherein the connecting moieties in said polymer chain are selected from the group consisting of $C_1$ to $C_{18}$ aliphatic carbon, aromatic carbon, oxygen, sulfur and a combination thereof;

$R^1$ is an n-valent moiety derived from R wherein R is selected from the group consisting of unsubstituted or substituted alkyl, unsubstituted or substituted alkenyl, unsubstituted or substituted $C_2$ to $C_{18}$ alkynyl, $C_3$ to $C_{22}$ substituted or unsubstituted cycloalkyl, $C_4$ to $C_{22}$ substituted or unsubstituted cycloalkenyl, $C_6$ to $C_{18}$ unsubstituted or substituted aryl, unsubstituted or substituted saturated heterocyclic ring, $C_5$ to $C_{18}$ unsubstituted or substituted unsaturated heterocyclic ring, $C_4$ to $C_{18}$ unsubstituted or substituted aromatic heterocyclic ring, $C_1$ to $C_{18}$ unsubstituted or substituted alkylthio group, and a first polymer chain having a number average degree of polymerization in the range of 5 to 1000;

R"" is an n-valent moiety derived from R" wherein R" is independently selected from the group consisting of substituted or unsubstituted $C_1$-$C_{22}$ alkyl, $C_2$-$C_{22}$ substituted or unsubstituted alkenyl, $C_2$-$C_{22}$ substituted or unsubstituted alkynyl, $C_3$-$C_{22}$ substituted or unsubstituted cycloalkyl, $C_6$-$C_{18}$ substituted or unsubstituted aryl, $C_2$-$C_{18}$ substituted or unsubstituted heterocyclyl, $C_7$-$C_{18}$ substituted or unsubstituted aralkyl, and $C_7$-$C_{18}$ substituted or unsubstituted alkaryl wherein R and R' are superior free radical leaving groups and R" and R"" are inferior free radical leaving groups;

Y selected from the group consisting of alkenyl, trialkoxysilyl, carboxy, carboxylate, —$NR^v_3$, —$N^+HR^v_3$, —$N^+R^v_4$, —$PR^v_3$, —$P^+HR^v_3$, —$P^+R^v_4$, dihydroxyphosphoryl, hydroxyoxidophosphoryl, phosphonato, —$PR^v(O)(OH)$, alkoxyphosphonato, aryloxyphosphonato, alkylphosphinato, —$PR^v(O)(O^-)$, hydroxysulfonyl, sulfonato, hydroxysulfinyl, sulfinato, 2-, 3- or 4-pyridinyl, 2-, 3- or 4-pyridinium, oligo (alkylene oxide), a polymer chain, a polymer moiety of a crosslinked styrene-divinyl benzene particle, a polymer moiety of a crosslinked acrylic particle, a polymer moiety of a microgel, and a polymer moiety of a silica particle; wherein $R^v$ is substituted or unsubstituted alkyl or aryl;

n, m and b are integers that independently range from 1 to 6; and wherein the substituents for the substituted groups for R, $R^1$, R", Z and $Z^1$ are independently selected from the group consisting of hydroxy, tertiary amino, halo, oxo, cyano, epoxy, carboxyl, alkoxy, alkyl having 1 to 32 carbon atoms, aryl, alkenyl having 2 to 32 carbon atoms, alkynyl having from 2 to 32 carbon atoms, saturated carbocyclic rings having 3 to 14 carbon atoms, unsaturated carbocyclic rings having 4 to 14 carbon atoms, aromatic carbocyclic rings having 6 to 14 carbon atoms, saturated heterocyclic rings having 3 to 14 carbon atoms, unsaturated heterocyclic rings having 3 to 14 carbon atoms and aromatic carbocyclic rings having 6 to 14 carbon atoms; and;

separating said byproduct from said derived polymer.

A first embodiment of this invention involves contacting a polymer containing groups —S—(C=S)$ZY_b$ with one or more nucleophilic reagents X to produce a derived polymer having one or more groups of the formula HS— and a byproduct containing $Y_b$.

A second embodiment of this invention involves contacting a polymer containing groups —S—(C=S)$ZY_b$ with one or more reagents X—H containing a transferable hydrogen atom and a source of free radicals to produce a derived polymer where said groups —S—(C=S)$Y_b$ are replaced by groups of the formula —H and a byproduct containing $Y_b$.

A third embodiment of this invention involves contacting a polymer containing groups —S—(C=S)$ZY_b$ with one or more reagents X—U containing a transferable group U and a source of free radicals to produce a derived polymer where said groups —S—(C=S)$ZY_b$ are replaced by groups of the formula —U and a byproduct containing $Y_b$.

A fourth embodiment of this invention involves exposing a polymer containing groups —S—(C=S)$ZY_b$ to a to produce a derived polymer where said groups —S—(C=S)$ZY_b$ are replaced by an unsaturated chain end and a byproduct containing $Y_b$. The temperature of said heat source will be in excess 180° C. or sufficient to cause elimination of said groups —S—(C=S)$ZY_b$ and provide a polymer with unsaturated end groups.

The process of the invention according to the above embodiments is results in cleavage of the polymer chain one of the bonds to —S— of the —S—(C=S)$ZY_b$ group. In the case of embodiment one this results in formation a —SH group. In the case of embodiments two and three the process fully removes the —S—(C=S)$ZY_b$ and replaces it with hydrogen (H) or another group (or U) respectively.

It will be obvious to those skilled in the art that other reaction steps whereby a starting polymer containing groups —S—(C=S)$ZY_b$ can be transformed so as to cleave the polymer chain at one of the bonds to the sulfur —S— to produce a byproduct containing extracting group $Y_b$ can be used within the process of the present invention.

DETAILED DESCRIPTION OF THE PREFERRED EMBODIMENTS

As defined herein:

"Living polymerization" means a process which proceeds by a mechanism whereby most chains continue to grow throughout the polymerization and where further addition of monomer results in continued polymerization (block copolymers can be prepared by sequential monomer addition of different monomers). The molecular weight is controlled by the stoichiometry of the reaction and narrow molecular weight distribution polymers can be produced.

"RAFT polymerization" means a radical polymerization carried out in the presence of a reversible addition-fragmentation transfer (RAFT) agent which shows the characteristics of living polymerization.

"RAFT agent" means a chain transfer agent used in RAFT polymerization that reacts by an addition fragmentation mechanism.

"Addition-fragmentation" is a two-step chain transfer mechanism wherein a radical addition is followed by fragmentation to generate a new radical species that reinitiates polymerization.

"Radical leaving group" means a group attached by a bond capable of undergoing homolytic scission during a reaction to thereby form a free radical.

"Stoichiometric amount" means a molar equivalent amount of reagent used to reduce each —S—(C=S)— group disposed on a starting polymer chain. Thus, for example, a stoichiometric amount of a reagent used for a starting polymer chain having a single —S—(C=S)— group would be at a 1:1 molar ratio with respect to the starting polymer and a stoichiometric amount of a reagent used for a starting polymer chain having a two —S—(C=S)— groups would be at a 2:1 molar ratio with respect to the starting polymer.

"Chain transfer constant" means the ratio of the rate constant for chain transfer to the rate constant for propagation at zero conversion of monomer and RAFT agent. If chain transfer occurs by addition-fragmentation, the rate constant for chain transfer ($k_{tr}$) is defined as follows:

$$k_{tr} = k_{add} \times \frac{k_\beta}{k_{-add} + k_\beta}$$

where $k_{add}$ is the rate constant for addition to the RAFT agent and $k_{add}$ and $k\beta$ are the rate constants for fragmentation in the reverse and forward directions respectively.

"GPC number average molecular weight" ($M_n$) means a number average molecular weight and "GPC weight average molecular weight" ($M_w$) means a weight average molecular weight measured by utilizing gel permeation chromatography (GPC). A Waters Associates liquid chromatograph equipped with differential refractometer was used. Tetrahydrofuran (flow rate of 1.0 mL/min) was used as an eluent. The molecular weights were provided as polystyrene equivalents.

"Polydispersity" ($M_w/M_n$) means GPC weight average molecular weight divided by GPC number average molecular weight. The lower the polydispersity, the narrower the molecular weight distribution.

"Cyclopolymerizable monomers" means compounds which contain two or more unsaturated linkages suitably disposed to allow propagation by a sequence of intramolecular and intermolecular addition steps leading the incorporation of cyclic units into the polymer backbone. Most compounds of this class are 1,6-dienes such as—diallylammonium salts (e.g., diallyldimethylammonium chloride), substituted 1,6-heptadienes (e.g., 6-dicyano-1,6-heptadiene, 2,4,4,6-tetrakis(ethoxycarbonyl)-1,6-heptadiene) and monomers of the following generic structure:

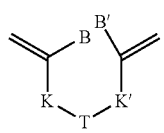

where substituents K, K', T, B, B' are chosen such that the monomer undergoes cyclopolymerization. For example:

B, B' are independently selected from the group consisting of H, $CH_3$, CN, $CO_2$Alkyl, Ph; K, K' are selected from the group consisting of $CH_2$, C=O, $Si(CH_3)_2$, 0; T is selected from the group consisting of $C(E)_2$, O, $N(Alkyl)_2$ salts, $P(Alkyl)_2$ salts, P(O)Alkyl. Additional monomers listed in Moad and Solomon, "The Chemistry of Radical Polymerization", Elsevier, Oxford, 2006, pp 185-194, are also suitable.

"Ring opening monomers" are monomers which contain a suitably disposed carbocyclic or heterocyclic ring to allow propagation by a sequence of intermolecular addition and intramolecular ring opening steps such as those described in Moad and Solomon, "The Chemistry of Radical Polymerization", Elsevier, Oxford, 2006, pp 194-208.

"Organometallic species" means a moiety containing one or more metal atoms from Groups III and IV of the Periodic Table and transition elements and organic ligands, preferably species, such as, $Si(X_a)3$, $Ge(X_a)3$ and $Sn(X_a)_3$ which provide radical leaving groups and initiate polymerization, $X_a$ being a group discussed later in the specification.

"Heterocyclic" or "heterocyclyl" means a ring structure containing 3 to 18 atoms at least one of which is selected from O, N and S, which may or may not be aromatic. Examples of "heterocyclyl" moieties are pyridyl, furanyl, thienyl, piperidinyl, pyrrolidinyl, pyrazoyl, benzthiazolyl, indolyl, benzofuranyl, benzothiophenyl, pyrazinyl, and quinolyl, optionally substituted with one or more of alkyl, haloalkyl and halo groups.

"Substituent functionality derived from a substituted or unsubstituted heterocycle attached via a nitrogen atom" means the group formed by excising a monovalent nitrogen (e.g. >NH) from an appropriate nitrogen containing heterocycle. Said heterocycles include pyrrolidine, pyrrole, indole, imidazole, carbazole, benzimidazole, benzotriazole, piperidine and isatin, all of which can be substituted or unsubstituted. For example, in the case of pyrrole, the substituent functionality is 1,3-butadiene-1,4-diyl, and in the case of pyrrolidine it is butane-1,4-diyl.

Unless specified otherwise, alkyl groups referred to in this specification can be branched or unbranched and contain from 1 to 18 carbon atoms. Alkenyl groups can be branched or unbranched and contain from 2 to 18 carbon atoms. Saturated or unsaturated or carbocyclic or heterocyclic rings can contain from 3 to 18 atoms. Aromatic carbocyclic or heterocyclic rings can contain 5 to 18 atoms.

"Random copolymer" is a copolymer consisting of macromolecules in which the probability of finding a given monomeric unit at any given site in the chain is independent of the nature of the adjacent units.

"Statistical copolymer" is a copolymer consisting of macromolecules in which the sequential distribution of the monomeric units obeys known statistical laws. An example of a statistical copolymer is one consisting of macromolecules in which the sequential distribution of monomeric units follows Markovian statistics.

"Microgel" means a polymeric network of microscopic dimensions of 0.01 to 100 microns.

"Ion exchange" means adsorbing of one or several ionic species accompanied by the simultaneous desorbing (displacement) of an equivalent amount of one or more other ionic species. In such a process, ions are exchanged between a solution and an ion exchanger, such as a conventional ion exchange resin.

The use of numerical values in the various ranges specified in this application, unless expressly indicated otherwise, are stated as approximations as though the minimum and maximum values within the stated ranges were both preceded by the word "about". In this manner, slight variations above and below the stated ranges can be used to achieve substantially the same results as values within the ranges. Also, the disclosure of these ranges is intended as a continuous range including every value between the minimum and maximum values, including the minimum and maximum end points of the range.

The present invention is directed to a process for removing one or more groups of the formula —S—(C=S)— from a starting polymer, which can be in the form of a solution, dispersion, or a combination thereof. By removing the groups of the formula —S—(C=S)— from the starting polymer the odors and any color that can be associated with the starting polymers is substantially minimized or eliminated.

Starting polymers suitable for the process of the present invention are produced by free radical polymerizing a monomer mixture in the presence of one or more free radical initiators and one or more sulfur based chain transfer agents that are also known as RAFT agents. However, starting polymers that possess groups S—(C=S)— and are made by other processes besides those utilizing the RAFT agents can also be employed in the present invention. The starting polymer can be a starting homopolymer, starting random, statistical, alternating or gradient copolymer, starting block polymer, starting star polymer, starting graft copolymer, starting dendritic or hyperbranched copolymer, starting microgel, or a combination thereof. The term "hyperbranched" means a polymer structure that includes branches-upon-branches type polymer architecture.

The monomer mixture can include at least one vinyl monomer having the formula:

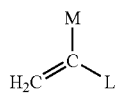

where L is selected from the group consisting of hydrogen, halogen, and substituted or unsubstituted $C_1$-$C_4$ alkyl; and where M is selected from the group consisting of hydrogen, R''', $CO_2H$, $CO_2R'''$, COR''', CN, $CONH_2$, $PO(OR''')_3$, CONHR''', $CONR'''_2$, $O_2CR'''$, OR''', and halogen, wherein R''' is independently selected from the group consisting of substituted or unsubstituted $C_1$-$C_{22}$ alkyl, $C_2$-$C_{22}$ substituted or unsubstituted alkenyl, $C_2$-$C_{22}$ substituted or unsubstituted alkynyl, $C_3$-$C_{22}$ substituted or unsubstituted cycloalkyl, $C_6$-$C_{18}$ substituted or unsubstituted aryl, $C_2$-$C_{18}$ substituted or unsubstituted heterocyclyl, $C_7$-$C_{18}$ substituted or unsubstituted aralkyl, and $C_7$-$C_{18}$ substituted or unsubstituted alkaryl; said substituents being independently selected from the group consisting of hydroxy, OR''', $CO_2H$, $O_2CR'''$, $CO_2R'''$, $C_1$-$C_{22}$ alkyl, $C_6$-$C_{18}$ aryl, =O (oxo), $C_6$-$C_{18}$ acyl, $SO_3H$, sulfonate, cyano, $C_3$-$C_{66}$ trialkoxysilyl, $C_3$-$C_{66}$ trialkylsilyl, halo, $C_2$-$C_{44}$ dialkylamino, amido and a combination thereof.

The specific monomers or comonomers in the monomer mixture can include one or more of the following: methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, functional methacrylates, acrylates and styrenes selected from glycidyl methacrylate, 2-hydroxyethyl methacrylate, hydroxypropyl methacrylate (all isomers), hydroxybutyl methacrylate (all isomers), methyl α-hydroxymethyacrylate, ethyl α-hydroxymethyacrylate, butyl α-hydroxymethyacrylate, N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide, N-methylacrylamide N,N-dimethylacrylamide, N-tert-butylmethacrylamide, N-n-butylmethacrylamide, N-methylolmethacrylamide, N-ethylolmethacrylamide, N-tert-butylacrylamide, N-n-butylacrylamide, N-methylolacrylamide, N-ethylolacrylamide, vinyl benzoic acid (all isomers), diethylaminostyrene (all isomers), alpha-methylvinyl benzoic acid (all isomers), diethylamino alpha-methylstyrene (all isomers). p-vinylbenzene sulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethyl-silylpropylmethacrylate, dibutoxymethylsilylpropyl methacrylate, diisopropoxymethylsilylpropyl methacrylate, dimethoxysilylpropyl methacrylate, diethoxysilyipropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilyipropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, vinyl butyrate, vinyl benzoate, vinyl chloride, vinyl fluoride, vinyl bromide, maleic anhydride, N-phenylmaleimide, N-butylmaleimide, N-vinylpyrrolidone, N-vinylcarbazole, butadiene, isoprene, chloroprene, ethylene and propylene.

The monomer mixture can include maleic anhydride, N-alkylmaleimide, N-arylmaleimide, dialkyl fumarate, a cyclopolymerizable monomer, a ring opening monomer, a macromonomer or a combination thereof. Alternatively, the monomer mixture can include aforestated monomers along with at least one of the aforedescribed vinyl monomers.

Other suitable monomers in the monomer mixture can include cyclopolymerizable monomers such as those disclosed in U.S. Pat. No. 5,830,966 or Moad and Solomon, "The Chemistry of Radical Polymerization", Elsevier, Oxford, 2006, pp 185-194, and ring opening monomers such as those described in Moad and Solomon, "The Chemistry of Radical Polymerization", Elsevier, Oxford, 2006, pp 194-208, both of which are incorporated herein by reference.

The synthesis of the starting polymer by RAFT polymerization can be carried out in emulsion, solution or suspension in either a batch; semi-batch, continuous, or in a feed mode. For lowest polydispersity (generally ranging from 1.04 to 1.4) starting polymers, the RAFT agent is typically added before polymerization is commenced. For example, when carried out in a batch mode in solution, the reactor is typically charged with a RAFT agent and a monomer, or a polymerization medium plus the monomer. Starting polymers with broader, yet controlled, polydispersity (generally ranging from 1.4 to 2.0) or with multimodal molecular weight distribution (generally ranging from 1.2 to 8.0) can be produced by controlled addition of the RAFT agent over the course of the polymerization process.

In the case of emulsion or suspension polymerization, the polymerization medium will often be predominantly water and the conventional stabilizers, dispersants and other additives can be present.

For solution polymerization, the polymerization medium can be chosen from a wide range of media to suit the monomer(s) being used. For example, aromatic hydrocarbons, such as, petroleum naphtha or xylenes; ketones, such as, methyl amyl ketone, methyl isobutyl ketone, methyl ethyl ketone or acetone; esters, such as, butyl acetate or hexyl acetate; and glycol ether esters, such as, propylene glycol monomethyl ether acetate.

The use of feed polymerization conditions allows the use of RAFT agents with lower chain transfer constants (generally ranging from 0.1 to 1.0) and allows the synthesis of starting polymers that are not readily achieved using batch polymerization processes. If the RAFT polymerization is carried out as a feed system, the reaction can be carried out in the following manner:

The reactor is charged with the chosen polymerization medium, the RAFT agent and optionally a portion of the monomer mixture. Into a separate vessel is placed the remaining monomer mixture. The free radical initiator is dissolved or suspended in polymerization medium in another separate vessel. The medium in the reactor is heated and stirred while the monomer mixture plus the medium and the initiator plus the medium, is introduced, for example by a syringe pump or other pumping device. The rate and duration of feed is largely determined by the quantity of the solution, the desired monomer/RAFT agent/initiator ratio and the rate of the polymerization. When the feed is complete, heating can be continued for an additional period. Following the completion of the polymerization, the starting polymer can be isolated by stripping off from the polymerization medium and/or unreacted monomer(s) or by precipitation with a non-solvent. Alternatively, the solution/emulsion of starting polymers in the polymerization medium can be used as such, if appropriate to its application.

Starting block and starting multi-block and starting gradient copolymers can be prepared by varying the rate of monomer(s) addition and/or by varying the sequence in which the monomer(s) can be added to the polymerization medium. Starting di-block (A-B) and starting tri-block (A-B-A, A-B-C and their permutations) copolymers are preferred. Starting gradient block polymer can be also prepared in a one-step process by making use of the inherent difference in reactivity of the monomer(s). For starting gradient block copolymers, it is often desirable to pick comonomers with disparate reactivity ratios. For example, maleic anhydride and styrene or (meth)acrylates. Starting block and graft copolymers can also be prepared from preexisting polymers which contain suitable functionality.

By appropriate selection of the groups R, $R^1$, Z, and $Z^1$ in the RAFT chain transfer agent of formulae I-III above, starting block copolymers with specific functionalities can be readily produced. Starting block copolymer can be prepared by starting with an existent polymer chain prepared by means other than RAFT polymerization and then modifying the end or other functionality such that the polymer chain is incorporated in a compound of formulae I-III so as to create a macromolecular RAFT agent that can be chain extended by RAFT polymerization. The GPC number average molecular weight of the starting polymers ranges from 200 to 1,000,000 preferably from 500 to 100,000. The polydispersity of the starting polymers ranges from 1.04 to 10 preferably from 1.05 to 3.

The free radical initiators suitable for use in the present invention include those compounds that provide initiating radicals that add to monomers to produce propagating radicals. The amount of initiator used depends upon the desired polydispersity, molecular weight and polymer structure of the resulting polymer. However, generally less than 10 weight percent based on the total amount of monomer mix is used. Preferably the amount of initiator used is in the range of 0.001 to 5.0 weight percent based on the total amount of monomer mix.

The source of initiating radicals includes such sources as the thermally induced homolytic scission of suitable initiators, such as peroxides, peroxyesters, or azo compounds; the spontaneous generation from a monomer, such as styrene; redox initiating systems; photochemical initiating systems or high energy radiation source, such as electron beam, X- or γ-radiation or a combination of these methods. The initiating system is chosen such that under the reaction conditions there is substantially no adverse interaction of the initiator or the initiating radicals with the RAFT agent under the reaction conditions. The initiator should also have the requisite solubility in the polymerization medium or the monomer mixture.

Examples of suitable sources of free radicals for the process of the present invention include azo compounds and peroxides, such as:

2,2'-azobis(isobutyronitrile), 2,2'-azobis(2-cyano-2-butane), dimethyl 2,2'-azobis(methyl isobutyrate), 4,4'-azobis(4-cyanopentanoic acid), 4,4'-azobis(4-cyanopentan-1-ol), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis[2-methyl-N-hydroxyethyl)]-propionamide, 2,2'-azobis(N,N'-dimethyleneisobutyramidine) dihydrochloride, 2,2'-azobis(2-amidinopropane) dihydrochloride, 2,2'-azobis(N,N'-dimethyleneisobutyramine), 2,2'-azobis(2-methyl-N-[1,1-bis(hydroxymethyl)-2-hydroxyethyl]propionamide), 2,2'-azobis(2-methyl-N-[1,1-bis(hydroxymethyl)ethyl] propionamide), 2,2'-azobis[2-methyl-N-(2-hydroxyethyl) propionamide], 2,2'-azobis(isobutyramide) dihydrate, 2,2'-azobis(2,2,4-trimethylpentane), 2,2'-azobis(2-methylpropane), t-butyl peroxyacetate, t-butyl peroxybenzoate, t-butyl peroxyoctoate, t-butyl peroxyneodecanoate, t-butylperoxy isobutyrate, t-amyl peroxypivalate, t-butyl peroxypivalate, di-isopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite, or dicumyl hyponitrite.

Photochemical initiator systems are chosen to have the requisite solubility in the reaction medium or monomer mixture and have an appropriate quantum yield for radical production under the conditions of the polymerization. Examples include benzoin derivatives, benzophenone, acyl phosphine oxides, and photo-redox systems. Free radicals can also be derived by direct photolysis of the compound of formula I-III.

Redox initiator systems are chosen to have the requisite solubility in the reaction medium or monomer mixture and have an appropriate rate of radical production under the conditions of the polymerization; these initiating systems can include combinations of the following oxidants and reductants.

Oxidants: potassium peroxydisulfate, hydrogen peroxide, and t-butyl hydroperoxide.

Reductants: iron (II), titanium (III), potassium thiosulfite, and potassium bisulfite.

Other suitable initiating systems are described in recent texts, such as, for example, in pages 79-111 in *The Chemistry of Radical Polymerization*, by Moad and Solomon, which was published by Oxford, London in 2006.

The polymerization process according to the present invention is generally performed under the conditions typical of conventional free-radical polymerization. Polymerization employing the RAFT agents of the present invention is suitably carried out with temperatures during the reaction in the range −20° C. to 200° C., preferably in the range 40° C. to 160° C.

The starting polymer will be prepared from a RAFT agent in which the group Z is covalently bonded to extracting groups $Y_b$. This starting polymer is contacted with a reagent or reaction conditions to release the derived polymer and form a byproduct which is removed taking advantage of the properties of the extracting groups $Y_b$ that enable efficient extraction.

The following scheme illustrates that the process of embodiment one of present invention by which the undesired sulfur component from the stating polymer can be removed for the case where a=b=1 and the reagent containing groups $X_a$, is a nucleophilic reagent (X). R is a polymer chain.

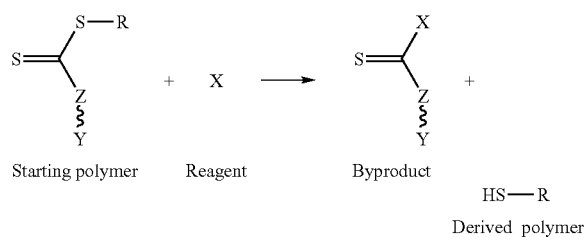

Starting polymer  Reagent  Byproduct
HS—R
Derived polymer

The following scheme illustrates the process of embodiment two of present invention by which the undesired sulfur component from the stating polymer can be removed for the case where a=b=1 and the reagent containing groups $X_a$ is X'—H which is a transfer agent. The process is a free radical reduction and is catalyzed by a source of free radicals. R is a polymer chain

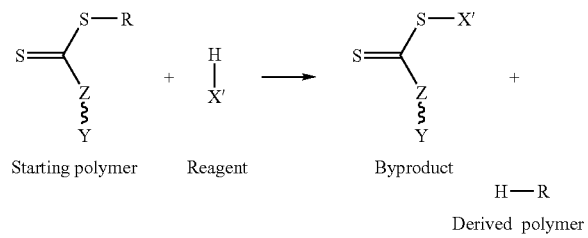

Starting polymer  Reagent  Byproduct
H—R
Derived polymer

The following scheme illustrates the process of embodiment three of present invention by which the undesired sulfur component from the stating polymer can be removed for the case where a=b=1, the reagent containing groups $X_a$ is X'—U which is a transfer agent and U is a transferable group. The process is catalyzed by a source of free radicals. R is a polymer chain.

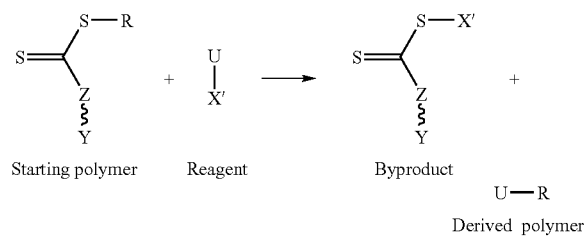

Starting polymer  Reagent  Byproduct
U—R
Derived polymer

The following scheme illustrates the process of embodiment four of present invention by which the undesired sulfur component from the stating polymer can be removed for the case where a=b=1 and the 'reagent' is simply a heat source and the polymer has a terminal styrene unit adjacent to the —S—(C=S)$ZY_b$ group. R is a polymer chain.

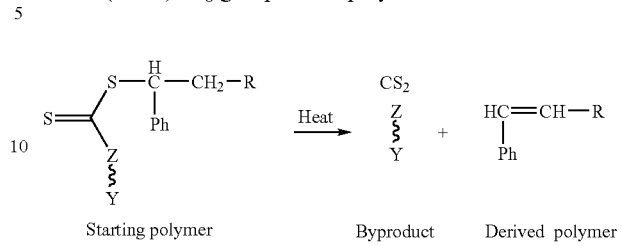

Starting polymer  Byproduct  Derived polymer

The following scheme illustrates the process of embodiment four of present invention by which the undesired sulfur component from the stating polymer can be removed for the case where a=b=1 and the 'reagent' is simply a heat source and the polymer has a terminal methyl methacrylate unit adjacent to the —S—(C=S)$ZY_b$ group. R is a polymer chain. The derived polymer is a macromonomer.

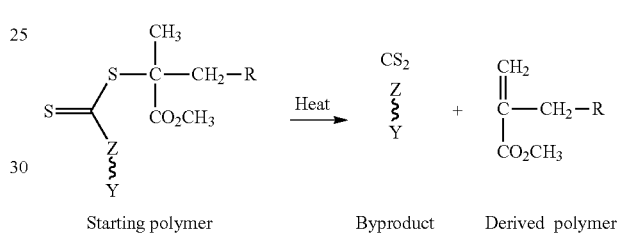

Starting polymer  Byproduct  Derived polymer

As described above the extracting group $Y_b$ can be a reactive, ionic or ionizable group or a polymer moiety made by any polymerization process or other group chosen to enable the byproduct to be readily separated for the polymer.

When $Y_b$ is a polymeric moiety (also called a polymer or solid support), Z of the RAFT agent used to make the starting polymer then comprises a linking group attached to the polymeric moiety. The starting polymer is a graft copolymer and the overall process which comprises synthesis of a starting polymer and subsequent treatment with the reagent containing groups $X_a$ can be described as a polymer supported polymer synthesis. In such cases polymerization is often performed in the presence of added soluble RAFT agent [R—S—(C=S)Z] that has similar reactivity to the polymer bound RAFT agent R—S—(C=S)$ZY_b$. That is, R is chosen to have similar properties as a free radical leaving group and Z is chosen to confer similar reactivity on the RAFT agent. Suitable polymer supports can include Wang or Merrifield resin and appropriately functionalized inorganic particles such as silica particles. The synthesis of polymers attached to polymer supports by RAFT polymerization is described in WO0506155 assigned to the University of Leeds.

In embodiments one through three, the process of the present invention includes contacting the at least one of the aforedescribed starting polymers, preferably with at least a stoichiometric amount of one or more the reagents.

The reagent can be a low molecular weight compound reagent, a polymeric reagent, or a combination thereof. The low molecular weight reagent is preferred.

The reagent containing groups $X_a$ may also contain extracting groups $Y_b$ and be of the form $X_a \sim\sim\sim Y_b$. This facilitates any excess of the reagent above the stoichiometric amount that may be used to also be efficiently separated from the derived polymer. The reagent $X_a \sim\sim\sim\sim Y_b$ is preferably chosen so as not to limit or inhibit the rate of reaction with the starting polymer. For example the groups $Y_b$ of the reagent and of the starting polymer should not both be a polymer moiety when the rate of reaction would be unduly limited by the rate of diffusion.

In embodiment one of this invention, the reagent containing groups $X_a$ is selected from nucleophiles which include primary and secondary amines, ammonia, thiols, and hydroxide ion. It also includes hydride reducing agents such as sodium borohydride and lithium aluminum hydride.

Typically, an excess above the stoichiometric amount of the reagent used generally varies in the range of from 1.01:1 to 2:1, preferably in the range of from 1.01:1.2 moles of groups $X_a$ to moles of groups of the formula —S—(C=S)—. The excess amount of the reagent should be chosen to achieve an acceptable rate of reaction and to avoid by-product formation. The stoichiometric amount is more preferred.

Depending upon the nature of the starting polymer and the reagent being used, the foregoing contacting step can be conducted at ambient temperature or preferably at reaction temperatures ranging from 15° C. to 100 C. Preferably the mixture of the starting polymer and the reagent is also subjected to agitation to facilitate the reaction, preferably under an inert atmosphere, preferably of nitrogen or argon. Depending upon the nature of the starting polymer, the concentration of the reagent being used and the reaction temperature, the contacting step can be completed in 5 minutes to 24 hours.

Derived polymers with SH groups may undergo side reactions such as oxidation to form disulfides and/or thiolactonization in the case of acrylic polymers.

If desired, the starting polymer in the aforedescribed contacting step can be concurrently contacted with a reducing agent such as from a bisulfite salt preferably sodium bisulfite ($Na_2S_2O_4$); tetraalkylammonium bisulfite, preferably tetraethylammonium bisulfite; a thiosulfate salt preferably sodium thiosulfate ($Na_2S_2O_3$); a tertiary phosphine or its salt preferably tris(2-carboxyethyl)phosphine hydrochloride, or ascorbic acid of the following formula:

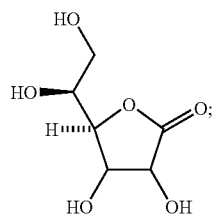 [SMILES: O=C1O[C@H]([C@@H](O)CO)C(O)C1O]

an ascorbate salt, preferably of the following formula:

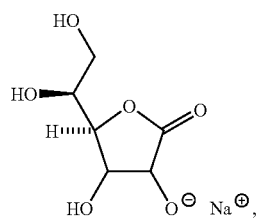 [SMILES: O=C1O[C@H]([C@@H](O)CO)C(O)C1[O-] ; [Na+]]

or a combination thereof. The amount of reducing agent added can typically vary in the range of from 0.1 to 1.0 molar equivalent of the reagent.

The completion of the foregoing contacting step results in a byproduct containing the extracting group $Y_b$. If the byproduct is insoluble in the medium in which starting polymer is carried, it can be separated by conventional separation methods, such as filtering, flocculating, centrifuging, decanting, or a combination thereof. If the byproduct is soluble in the medium in which starting polymer is carried, it can be separated by conventional separation methods, such as solvent extracting, precipitating, adsorbing, ion exchanging, or a combination thereof. The resulting finished/derived polymer can be in the form of a solution, dispersion, precipitate or a combination thereof. Preferably, all of the —S—(C=S)— groups in the starting polymers are converted to (—SH) groups the process of this embodiment of the present invention.

Generally, the derived polymer can have on average 1 to 6 (—SH) groups. If condensation polymers, such as polythiourethanes are desired, the finished polymer should preferably have on average 2 to 6 (—SH) groups. These polythiourethanes can be advantageously formulated as casting material for optical lenses and can be prepared by contacting the derived polymer having on average 2 to 6 (—SH) groups with a di-isocyanate, such as toluene diisocyanate, m-xylylene diisocyanate, hexamethylene disocyanate, diphenylmethane diisocyanate or a polymer chain with isocyanate end groups preferably at a stoichiometric molar ratio of (—SH)/(—NCO) ranging from 0.8 to 1.2. Such a polythiourethane has been described in Application US20040171765A1. If desired, the derived polymer can be contacted with a diacid in the presence of a condensation catalyst or with a diacid chloride to form a polythioester. The derived polymers can also be oxidatively coupled to form new polymers containing disulfide linkages. The derived polymers can also be used in crosslinking reactions for example in the formation of crosslinked films, coatings, networks or microgels. For such applications when forming a crosslinked polymer the (—SH) groups in the derived polymer preferably range from 2 and 6. For these applications requiring linear polymers the derived polymer preferably has 2 (—SH) groups.

Thiol (—SH) functionality can also be used to form crosslinks in network polymers and microgels and to form conjugates to other polymers including biological polymers, such as proteins.

Other applications of thiol-functional polymers relate to the property of thiols to complex metals, such as gold and cadmium. Thus, it is possible to use thiol-functional polymers to form nanoparticles based on gold or cadmiumk selenide. It is also possible to use such polymers as metal sequestering agents.

In embodiment two of this invention the reagent containing groups $X_a$ is selected from free radical reducing agents that include group (VI) hydrides (derivatives of tin germanium or silicon such as, tri-n-butyl stannane) and hypophosphite salts (for example a tetra-alkylammonium hypophosphite as described in WO05113612A1). X is a transferable hydrogen atom. Other suitable free radical reducing agents are described in the paper by Studer and Amrein (*Synthesis* 2002, 835-849). Hydrogen atom donor solvents such as isopropanol may also be suitable particularly when the derived polymer is an acrylic polymer such as poly(acrylic acid) or poly(butyl acrylate).

Typically, an excess above the stoichiometric amount of the reagent used generally varies in the range of from 1.01:1 to 2:1, preferably in the range of from 1.01:1 to 1.2:1 moles of groups $X_a$ to moles of groups of the formula —S—(C=S)—. The excess amount of the reagent should be chosen to achieve an acceptable rate of reaction and to avoid by-product formation: The stoichiometric amount is more preferred. A source of free radicals is required which can be chosen from those listed above as polymerization initiators. The concentration of free radicals generated is preferred to be between 0.01 and 1 molar equivalents of the reagent containing groups $X_a$, more preferably it is between 0.05 and 0.2 molar equivalents of the reagent containing groups $X_a$.

Depending upon the nature of the starting polymer and the reagent being used, the foregoing contacting step can be conducted at temperatures ranging from 15° C. to 150 C. The reaction temperature and the source of free radicals should be chosen to provide an appropriate rate of radical generation. Preferably the mixture of the starting polymer and the reagent is also subjected to agitation to facilitate the reaction, preferably under an inert atmosphere, preferably of nitrogen or argon. Depending upon the nature of the starting polymer, the concentration of the reagent being used and the reaction temperature, the contacting step can be completed in 5 minutes to 24 hours.

Preferred free radical reducing agents are tetra-butylammonium hypophosphite and 1-ethyl piperidine hypophosphite.

The completion of the foregoing contacting step results in a byproduct containing the extracting group $Y_b$. If the byproduct is insoluble in the medium in which starting polymer is carried, it can be separated by conventional separation methods, such as filtering, flocculating, centrifuging, decanting, or a combination thereof. If the byproduct is soluble in the medium in which starting polymer is carried, it can be separated by conventional separation methods, such as solvent extracting, precipitating, adsorbing, ion exchanging, or a combination thereof. The resulting finished/derived polymer can be in the form of a solution, dispersion, precipitate or a combination thereof. Preferably, all of the —S—(C=S)— groups in the starting polymers are converted to (—H) groups during the process of this embodiment of the present invention.

In embodiment three of this invention the reagent containing groups $X_a$ is selected from organic chain transfer agents that include addition-fragmentation chain transfer agents such as certain macromonomers and allyl sulfides. These transfer agents are described in Moad and Solomon, "The Chemistry of Radical Polymerization", Elsevier, Oxford, 2006, pp 296-309. The transfer agent may also be selected from other reagents that function by transfer or a group or atom other than hydrogen, for example, a disulfide (where X is S-alkyl or S-aryl) or a halocarbon such as carbon tetrachloride or carbon tetrabromide (where X is halogen). These transfer agents are described in Moad and Solomon, "The Chemistry of Radical Polymerization", Elsevier, Oxford, 2006, pp 291-294. The transfer agent is chosen so as to have a suitably high reactivity towards the propagating radical.

The conditions used are similar to those used for embodiment two. Preferably, all of the —S—(C=S)— groups in the starting polymers are converted to (—U) groups during the process of this embodiment of the present invention.

In embodiment four of this invention 'the reagent' is infrared energy provided by a heat source. The process may be performed in an oven, in a single screw or twin screw extruder or another heating device. The starting polymer may be a polymer melt, it may be in solution in a high boiling solvent, it may be in a low boiling solvent in a pressure vessel or autoclave. The temperature used is typically in the range 180° C. to 300° C. Preferably in the range 200° C. to 250° C. The temperature is chosen so as to achieve an acceptable rate of reaction and to avoid by-product formation by thermal degradation of the derived polymer.

Preferably, all of the —S—(C=S)— groups in the starting polymers are converted to unsaturated end groups during the process of this embodiment of the present invention.

The RAFT agent used to form the starting polymer is of the formula:

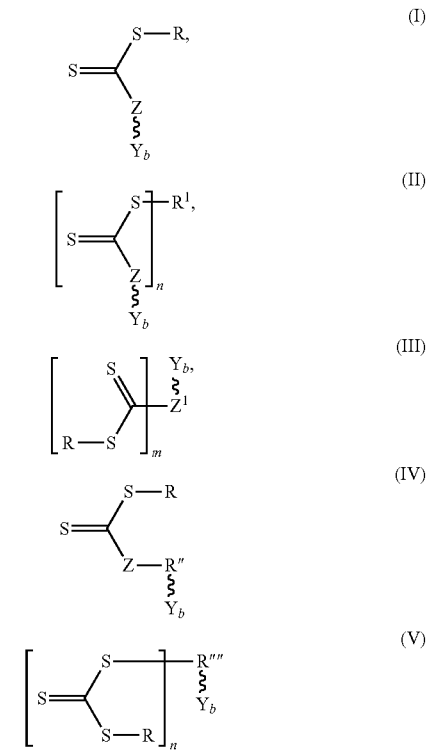

or a combination thereof;
wherein R and R' are superior free radical leaving groups and R" and R"" are chosen to be inferior free radical leaving groups; and wherein, R is selected from the group consisting of unsubstituted or substituted alkyl, unsubstituted or substituted alkenyl, unsubstituted or substituted $C_2$ to $C_{18}$ alkynyl, $C_3$ to $C_{22}$ substituted or unsubstituted cycloalkyl, $C_4$ to $C_{22}$ substituted or unsubstituted cycloalkenyl, $C_6$ to $C_{18}$ unsubstituted or substituted aryl, unsubstituted or substituted saturated heterocyclic ring, $C_5$ to $C_{18}$ unsubstituted or substituted unsaturated heterocyclic ring, $C_4$ to $C_{18}$ unsubstituted or substituted aromatic heterocyclic ring, $C_1$ to $C_{18}$ unsubstituted or substituted alkylthio group, and a first polymer chain having a number average degree of polymerization in the range of 5 to 1000;

wherein R" is independently selected from the group consisting of substituted or unsubstituted $C_1$-$C_{22}$ alkyl, $C_2$-$C_{22}$ substituted or unsubstituted alkenyl, $C_2$-$C_{22}$ substituted or unsubstituted alkynyl, $C_3$-$C_{22}$ substituted or unsubstituted cycloalkyl, $C_6$-$C_{18}$ substituted or unsubstituted aryl, $C_2$-$C_{18}$ substituted or unsubstituted heterocyclyl, $C_7$-$C_{18}$ substituted or unsubstituted aralkyl, and $C_7$-$C_{18}$ substituted or unsubstituted alkaryl;

Z is selected from the group consisting of unsubstituted or substituted alkyl, $C_6$ to $C_{18}$ unsubstituted or substituted aryl, unsubstituted or substituted heterocyclic ring, unsubstituted or substituted $C_1$ to $C_{18}$ alkylthio, SR, unsubstituted or substituted arylthio, unsubstituted or substituted $C_1$ to $C_{18}$ alkoxy, unsubstituted or substituted aryloxy, unsubstituted or substituted amino, unsubstituted or substituted $C_1$ to $C_{18}$ alkoxycarbonyl, unsubstituted or substituted aryloxycarbonyl, carboxy, unsubstituted or substituted $C_1$ to $C_{18}$ acyloxy, unsubstituted or substituted aroyloxy, unsubstituted or substituted carbamoyl, $C_2$ to $C_{18}$ dialkyl-phosphonato, diarylphosphonato, $C_1$ to $C_{18}$ dialkyl-phosphinato, diaryl-phosphinato, $C_1$-$C_{22}$ trialkoxysilyl, $C_1$-$C_{22}$ trialkylsilyl and a second polymer chain having a number average degree of polymerization in the range of 5 to 1000;

$R^1$ is an n-valent moiety derived from R;

R'''' is an n-valent moiety derived from R'';

$Z^1$ is an m-valent moiety derived from a species selected from the group consisting of unsubstituted or substituted alkyl, unsubstituted or substituted aryl and a third polymer chain having a number average degree of polymerization in the range of 5 to 1000 wherein the connecting moieties in said polymer chain are selected from the group consisting of $C_1$ to $C_{18}$ aliphatic carbon, aromatic carbon, oxygen, sulfur and a combination thereof;

Y selected from the group consisting of alkenyl, trialkoxysilyl, carboxy (—$CO_2H$), carboxylate (—$CO_2^-$), tertiary amino (—$NR^v_3$), tertiary ammonium (—$N^+HR^v_3$), quaternary ammonium (—$N^+R^v_4$), tertiary phosphine (—$PR^v_3$), tertiary phosphonium (—$P^+HR^v_3$), quaternary phosphonium (—$P^+R^v_4$), dihydroxyphosphoryl [—$P(O)(OH)_2$], hydroxyoxidophosphoryl [—$P(O)(OH)(O)$—], phosphonato [—$P(O)(O^-)_2$], hydroxyphosphoryl [—$PR^v(O)(OH)$], alkoxy or aryloxyphosphonato [—$P(OR^v)(O)(O^-)$], alkyl or arylphosphinato [—$PR^v(O)(O^-)$], hydroxysulfonyl (—$S(O)_2$(OH), sulfonato (—$S(O)_2(O^-)$, hydroxysulfinyl (—$S(O)$(OH), sulfinato (—$S(O)(O^-)$, 2-, 3- or 4-pyridinyl, 2-, 3- or 4-pyridinium, oligo(alkylene oxide), a polymer chain, a polymer moiety of a crosslinked styrene-divinyl benzene particle, a polymer moiety of a crosslinked acrylic particle, a polymer moiety of a microgel, and a polymer moiety of a silica particle; wherein $R^v$ is substituted or unsubstituted alkyl or aryl;

n, m and b are integers that independently range from 1 to 6; and wherein the substituents for the substituted groups for R, $R^1$, R'', Z and $Z^1$ are independently selected from the group consisting of hydroxy, tertiary amino, halogen, oxo, cyano, epoxy, carboxylic acid, alkoxy, alkyl having 1 to 32 carbon atoms, aryl, alkenyl having 2 to 32 carbon atoms, alkynyl having from 2 to 32 carbon atoms, saturated carbocyclic rings having 3 to 14 carbon atoms, unsaturated carbocyclic rings having 4 to 14 carbon atoms, aromatic carbocyclic rings having 6 to 14 carbon atoms, saturated heterocyclic rings having 3 to 14 carbon atoms, unsaturated heterocyclic rings having 3 to 14 carbon atoms and aromatic carbocyclic rings having 6 to 14 carbon atoms.

The starting polymer is then of the following structure

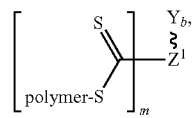

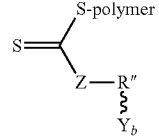

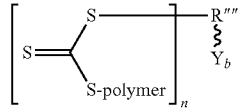

and the derived polymer will have the structure polymer-SH, polymer-H polymer-U or will possess an unsaturated end group when formed by embodiments 1-4 respectively.

Some classes of preferred RAFT agents are dithiobenzoate derivatives of the following structure

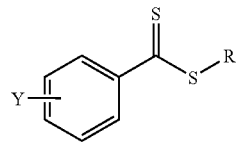

wherein Y and R are as defined above, dithioesters of the following structure

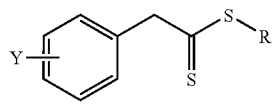

wherein Y and R are as defined above, trithiocarbonates of the following structure

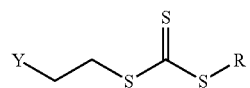

wherein Y and R are as defined above, and xanthates of the following structure

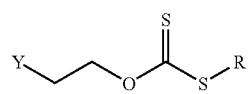

wherein Y and R are as defined above,

Some preferred R groups are cyanomethyl, 1-cyanoethyl, 2-cyanoprop-2-yl and 2-cyanobut-2-yl, (alkoxycarbonyl)methyl, 1-(alkoxycarbonyl)ethyl, 2-(alkoxycarbonyl)prop-2-yl, 2-(alkoxycarbonyl)but-2-yl. The R groups 2-cyanoprop-2-yl and 2-cyanobut-2-yl are preferred when the polymer comprises a methacrylate monomer.

Some preferred RAFT agents are cyanomethyl 2-carboxyethyl trithiocarbonate

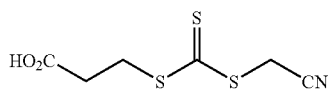

cyanomethyl polyethylene glycol methyl ether)carboxyethyl trithiocarbonate

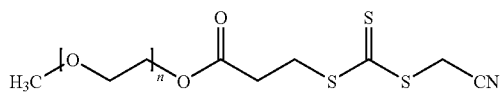

cyanomethyl 3-(trimethoxysilyl)propyl trithiocarbonate.

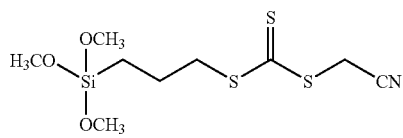 [SMILES: CO[Si](CCCSC(=S)SCC#N)(OC)OC]

This RAFT agent may be used to prepare silica particles functionalized with RAFT agent of the following structure either by functionalization of existing —OH functional silica particles or by a sol-gel process.

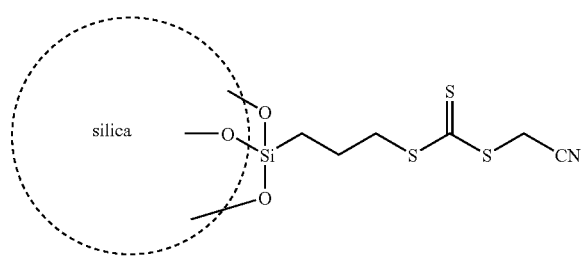

Other suitable RAFT agents are described in WO9801478A1 and U.S. Pat. No. 6,642,318 assigned to DuPont and CSIRO, in U.S. Pat. No. 6,855,840 issued to the University of Southern Mississippi and in WO0506155 assigned to the University of Leeds.

Inclusion of functionality $Y_b$ may also allow for recovery and recyclability of the RAFT agent or its precursor.

A composition that includes the derived polymer can be used in an automotive refinish coating composition, automotive OEM coating composition, compatibilizer, thermoplastic elastomer, dispersant, flocculant, surfactant, rheology control agent, additive used to modify the surface properties of bulk metals, polymers and plastics, photoresist, engineering plastic, adhesive, sealant, paper coating composition and a printing ink.

EXAMPLES

The following examples demonstrate the cleavage of thiocarbonylthio groups in the starting polymers and byproduct removal.

Materials

VAZO®88=1,1'-Azobis(cyclohexanecarbonitrile) [CAS Registry number 2094-98-6] (E. I. du Pont de Nemours and Company, Wilmington, Del.)

3-Mercaptopropionic acid, Sigma-Aldrich Chemical Co., Milwaukee, Wis.

Chloroacetonitrile, Sigma-Aldrich Chemical Co., Milwaukee, Wis.

1-Ethylpiperidine hypophosphite ([145060-63-5], Sigma-Aldrich Chemical Co., Milwaukee, Wis.

n-Butylamine, Sigma-Aldrich Chemical Co., Milwaukee, Wis.

Characterization Methods

GPC was performed with a Waters Associates liquid chromatograph equipped with differential refractometer and 3×Mixed C and 1 mixed E PLgel column (each 7.5 mm×300 mm) from Polymer Laboratories. Tetrahydrofuran (flow rate of 1.0 mL/min) was used as eluent at 22±2° C. The columns were calibrated with narrow polydispersity polystyrene standards (Polymer Laboratories).

NMR spectra were recorded on a Bruker AC 200 MHz or Bruker Av 400 MHz spectrometer. Chemical shifts are quoted relative to external tetramethylsilane (TMS).

Example 1

Preparation of cyanomethyl 2-carboxyethyl trithiocarbonate

3-Mercaptopropionic acid (5.3 g, 0.05 mol) was added within 10 minutes to a stirring suspension of potassium carbonate (7.0 g, 0.051 mol) in acetonitrile (40 mL) at room temperature. The reaction mixture was added carbon disulfide (3.8 g, 0.05 mol). The resulting yellow mixture was kept stirring for two hours and then added chloroacetonitrile (3.78 g, 0.05 mol). The resulting mixture was allowed to stir at room temperature for further one hour. Water (50 mL) was added, the yellow aqueous solution was acidified with dilute hydrochloric acid until pH~2 and extracted with diethyl ether (50 mL×2). The organic layer was dried over anhydrous magnesium sulfate. After removal of solvent, the product cyanomethyl carboxyethyl trithiocarbonate was obtained as a yellow solid (6.4 g, 58% yield) after column chromatography (silica-gel; ethyl acetate: n-hexane 3:7 as solvent). $^1$H NMR (CDCl$_3$) δ 2.85 (t, 2H, HOOCCH$_2$); 3.65 (t, 2H, CH$_2$S); 4.15 (s, 2H, NCCH$_2$S), 8.20 (br s, 1H, COOH). $^{13}$C NMR (CDCl$_3$) δ 21.5, 31.7, 32.5, 114.6, 176.9, 218.3.

Example 2

Preparation of poly(butyl acrylate) 2-carboxyethyl trithiocarbonate A solution of the RAFT agent cyanomethyl 2-carboxyethyl trithiocarbonate (300 mg) and AIBN (2.2 mg) in butyl acrylate (6 mL) and ethyl acetate (4 mL) was degassed through three freeze-evacuate-thaw cycles and heated at 60° C. for 5 hours. Removal of the volatiles under reduced pressure afforded a yellow polymer (1.7 g, 32% conversion) of Mn=990 and Mw/Mn=1.23. The methylene hydrogens of the 2-carboxyethyl group appeared at 2.8 and 3.5 ppm in the proton NMR. The end group methine hydrogens [—CH(CO$_2$Bu)—SCS] appeared at 4.8 ppm.

Example 3

Preparation of polystyrene 2-carboxyethyl trithiocarbonate A solution of the RAFT agent cyanomethyl 2-carboxyethyl trithiocarbonate (250 mg) and Vazo-88® initiator supplied by DuPont Company of Wilmington, Del. (8 mg) in styrene (8 mL) and ethyl acetate (2 mL) was degassed through three freeze-evacuate-thaw cycles and heated at 90° C. for 16 hours. Removal of the volatiles under reduced pressure afforded a yellow polymer (4.1 g, 51% conversion) of Mn=2350 and Mw/Mn=1.07. The methylene hydrogens of the 2-carboxyethyl group appeared at 2.8 and 3.5 ppm in the proton NMR. The end group methine hydrogens [—CH(Ph)—SCS] appeared at 4.6-5.0 ppm.

Example 4

End group removal from poly(butyl acrylate) 2-carboxyethyl trithiocarbonate by aminolysis. A solution of the poly (butyl acrylate) cyanomethyl 2-carboxyethyl trithiocarbonate (240 mg, from example 2) was dissolved in toluene (1 mL) and n-butylamine (100 µL) was added and the solution was stirred at ambient temperature for 16 hours. The product was diluted with ethyl acetate, washed with water and brine and dried over magnesium sulfate. The polymer was isolated by evaporation of the solvent. The signals at 4.8 ppm were absent from the NMR spectrum indicating complete end group removal and the signals at 2.8 and 3.5 ppm were much reduced with relation to those in the spectrum of the starting polymer. The polymer was further purified by dissolution in ethyl acetate and the resultant solution was washed with dilute hydrochloric acid, aqueous sodium hydroxide, water, brine and dried over magnesium sulfate. The polymer was isolated by evaporating the solvent. The signals at 2.8, 3.5 and 4.8 ppm were absent from the NMR spectrum indicating by-product removal. A new signal at 3.8 ppm was attributed to a methine next to sulfur of the new end group [—CH(CO$_2$Bu)—SH].

Example 5

End group removal from polystyrene 2-carboxyethyl trithiocarbonate by aminolysis. A solution of the polystyrene cyanomethyl 2-carboxyethyl trithiocarbonate (320 mg, from example 3) was dissolved in toluene (1 mL) and n-butylamine (50 µL) was added and the solution was stirred at ambient temperature for 16 hours. The product was diluted with ethyl acetate, washed with water and brine and dried over magnesium sulfate. The polymer was isolated by evaporation of the solvent. The signals at 2.8 and 3.5 and 4.6-5.0 were absent from the NMR spectrum indicating complete end group removal. A new signals at 3.4-4.0 ppm are attributed to a methine next to sulfur of the new end group [—CH(Ph)—SH].

Example 6

End group removal from poly(butyl acrylate) 2-carboxyethyl trithiocarbonate by radical induced reduction. A solution of the poly(butyl acrylate) cyanomethyl 2-carboxyethyl trithiocarbonate (100 mg, from example 2) was dissolved in toluene (1 mL) and ethylpiperidine hypophosphite (90 mg) and Vazo-88® initiator (4 mg) was added. The solution was placed in an ampoule and degassed with three freeze-evacuate-thaw cycles and the solution was heated under vacuum 100° C. for 4 hours. The product was diluted with ethyl acetate, washed with water and brine and dried over magnesium sulfate. The poly(butyl acrylate) isolated by evaporation of the solvent had Mn=715 and Mw/Mn=1.19. The signals at 2.8, 3.5 and 4.8 ppm were absent from the NMR spectrum indicating complete removal of the end group and by-product.

Example 7

End group removal from polystyrene 2-carboxyethyl trithiocarbonate by radical induced reduction. A solution of the polystyrene cyanomethyl 2-carboxyethyl trithiocarbonate (160 mg, from example 3) was dissolved in toluene (1 mL) and 1-ethylpiperidine hypophosphite (180 mg) and Vazo-88® initiator (5 mg) was added. The solution was placed in an ampoule and degassed with three freeze-evacuate-thaw cycles and the solution was heated under vacuum 100° C. for 16 hours. The product was diluted with ethyl acetate, washed with water and brine and dried over magnesium sulfate. The poly(styrene) isolated by evaporation of the solvent had Mn=1693 and Mw/Mn=1.12. The signals at 2.8, 3.5 and 4.6-5.0 ppm were absent from the NMR spectrum indicating complete removal of the end group and by-product.

Example 8

Preparation of Cyanomethyl Poly(Ethylene Glycol Methyl ether)carboxyethyl Trithiocarbonate. Cyanomethyl carboxyethyl trithiocarbonate (0.5 g), and poly(ethylene glycol) methyl ether (Mn~750) (1.70 g) in dichloromethane (20 mL) was added 1,3-dicyclohexylcarbodiimide (466 mg) at room temperature with stirring. After one hour, the by-product, dicyclohexylurea was filtered and concentrated the filtrate to give the title product (2.2 g) in quantitative yield.

Example 9

Preparation of polystyrene 2-(poly(ethylene glycol)methyl ether)carboxyethyl trithiocarbonate A solution of the RAFT agent cyanomethyl 2-(poly(ethylene glycol) methyl ether) carboxyethyl trithiocarbonate (400 mg) and styrene (4 g) was degassed through three freeze-evacuate-thaw cycles and heated at 110° C. for 16 hours. Removal of the volatiles under reduced pressure afforded a yellow polymer (2.35 g, 53% conversion) of Mn=8740 and Mw/Mn=1.21. The methylene hydrogens and the methoxy hydrogens of the poly(ethylene glycol methyl ether) group appeared at 3.7 and 3.4 ppm respectively in the proton NMR. The end group methine hydrogens [—CH(Ph)—SCS] appeared at 4.6-5.0 ppm.

Example 10

End group removal from polystyrene 2-(poly(ethylene glycol) methyl ether)carboxyethyl trithiocarbonate by radical induced reduction. A solution of the polystyrene 2-(poly(ethylene glycol) methyl ether)carboxyethyl trithiocarbonate (250 mg, from example 9) was dissolved in toluene (3 mL) and 1-ethylpiperidine hypophosphite (500 mg) and Vazo-88® initiator (9.9 mg) was added. The solution was placed in an ampoule and degassed with three freeze-evacuate-thaw cycles and the solution was heated under vacuum 110° C. for 5 hours. The initial yellow color solution became colorless. The product was diluted with ethyl acetate, washed with water and brine and dried over magnesium sulfate. The polystyrene isolated by evaporation of the solvent had Mn=7430 and Mw/Mn=1.17. The signals at 3.7, 3.4 and 4.6-5.0 ppm were absent from the NMR spectrum indicating complete removal of the end group and by-product.

Example 11

Preparation of Cyanomethyl 3-(trimethoxysilyl)propyl trithiocarbonate Trithiocarbonate. (3-Mercaptopropyl)trimethoxysilane (1.97 g, 0.01 mol) was added within 10 minutes to a stirred suspension of sodium hydride (60% w/w, 0.42 g, 0.0175 mol) in dry diethyl ether (20 mL) whilst maintaining the reaction temperature between 5-10° C. The reaction mixture was then cooled to ~0° C. when carbon disulfide (1.34 g, 0.012 mol) was added and the resulting mixture was kept at this temperature for one hour. Then α-Chloroacetonitrile (1.30 g, 0.017 mol) was added and the mixture was stirred at ambient temperature for a one hour. The reaction mixture was the filtered and the filtrate concentrated on rotary evaporator. Purification by chromatography on a short silica gel column (ethyl acetate: n-hexane 1:4) gave the title compound as a yellow liquid (2.25 g, 72%). $^1$H-nmr (CDCl$_3$) δ 0.75 (m, 2H), 1.86 (m, 2H), 3.46 (t, 2H), 3.58 (s, 9H), 4.15 (s, 2H).

Example 12

Preparation of polystyrene 2-carboxyethyl trithiocarbonate A solution of the RAFT agent cyanomethyl 3-(trimethoxysilyl)propyl trithiocarbonate and azobisisobutyronitrile ($1.68 \times 10^{-3}$M) and methyl acrylate (4.41M) in benzene was degassed through three freeze-evacuate-thaw cycles and heated at 60° C. for 8 hours. Removal of the volatiles under reduced pressure afforded a yellow polymer. Details are provided in the Table 1 below.

TABLE 1

| [RAFT Agent] ($10^{-3}$ M) | % Conv | $M_n \times 10^{-3}$ | $M_w/M_n$ | $M_n$(calc) × $10^{-3}$ |
|---|---|---|---|---|
| 4.0 | 80.0 | 77.3 | 1.06 | 76.2 |
| 8.0 | 75.5 | 41.9 | 1.05 | 36.1 |

Example 13

Preparation of polystyrene 2-carboxyethyl trithiocarbonate A solution of the RAFT agent cyanomethyl 3-(trimethoxysilyl)propyl trithiocarbonate in styrene was degassed through three freeze-evacuate-thaw cycles and heated at 120° C. for 16 hours. Removal of the volatiles under reduced pressure afforded a yellow polymer. Details are provided in the Table 2 below.

TABLE 2

| [RAFT Agent] ($10^{-2}$M) | % Conv. | $M_n \times 10^{-3}$ | $M_w/M_n$ | $M_n$(calc) × $10^{-3}$ |
|---|---|---|---|---|
| 2.53 | 73.3 | 29.9 | 1.1 | 26.2 |
| 7.59 | 80.6 | 9.9 | 1.1 | 9.6 |

What is claimed is:

1. A process for removing one or more groups of the formulas —S—(C=S)—Z Y$_b$, [—S—(C=S)]$_m$=Z$^1$Yb, or —S—(C=S)—S—R"Y$_b$ from a starting polymer, which is in the form of a melt, a solution, dispersion, or a combination thereof, said process comprising:

contacting said starting polymer containing groups Y$_b$ with one or more reagents containing groups X$_a$ to produce a derived polymer and a byproduct containing said groups Y$_b$, wherein said groups X$_a$ is one or more reactive groups and said groups Y$_b$ is an extracting group and wherein said a ranges from 1 to 30 and said, b is 1 or 2, wherein:

Z is selected from the group consisting of unsubstituted or substituted alkyl, $C_6$ to $C_{18}$ unsubstituted or substituted aryl, unsubstituted or substituted heterocyclic ring, unsubstituted or substituted $C_1$ to $C_{18}$ alkoxy, unsubstituted or substituted aryloxy, unsubstituted or substituted amino, unsubstituted or substituted $C_1$ to $C_{18}$ alkoxycarbonyl, unsubstituted or substituted aryloxycarbonyl, carboxy, unsubstituted or substituted C, to $C_{18}$ acyloxy, unsubstituted or substituted aroyloxy, unsubstituted or substituted carbamoyl, $C_2$ to $C_{18}$ dialkyl-phosphonato, diaryl-phosphonato, $C_1$ to $C_{18}$ dialkyl-phosphinato, diaryl-phosphinato, $C_1$-$C_{22}$ trialkoxysilyl, $C_1$-$C_{22}$ trialkylsilyl and a second polymer chain having a number average degree of polymerization in the range of 5 to 1000;

$Z^1$ is an m-valent moiety derived from a species selected from the group consisting of unsubstituted or substituted alkyl, unsubstituted or substituted aryl and a third polymer chain having a number average degree of polymerization in the range of 5 to 1000 wherein the connecting moieties in said polymer chain are selected from the group consisting of $C_1$ to $C_{18}$ aliphatic carbon, aromatic carbon, oxygen, sulfur and a combination thereof;

R" is independently selected from the group consisting of substituted or unsubstituted $C_1$-$C_{22}$ alkyl, $C_2$-$C_{22}$ substituted or unsubstituted alkenyl, $C_2$-$C_{22}$ substituted or unsubstituted alkynyl, $C_3$-$C_{22}$ substituted or unsubstituted cycloalkyl, $C_6$-$C_{18}$ substituted or unsubstituted aryl, $C_2$-$C_{18}$ substituted or unsubstituted heterocyclyl, $C_7$-$C_{18}$ substituted or unsubstituted aralkyl, and $C_7$-$C_{18}$ substituted or unsubstituted alkaryl wherein R" is an inferior free radical leaving group;

Y selected from the group consisting of alkenyl, trialkoxysilyl, carboxy (—CO$_2$H), carboxylate (—CO$_2^{31}$), tertiary amino, tertiary ammonium, quaternary ammonium, tertiary phosphine, tertiary phosphorium, quarternary phosphonium, dihydroxyphosphoryl, hydroxyoxidophosphoryl, phosphonato, -hydroxyphosphoryl, alkoxyphosphonato, aryloxyphosphonato, alkylphosphinato, arylphosphinato, hydroxysulfonyl, sulfonato, hydroxysulfinyl, sulfinato, 2-, 3- or 4- pyridinyl, and 2-, 3- or 4- pyridinium;

n and m are integers that independently range from 1 to 6; and wherein the substituents for the substituted groups for R", Z and $Z^1$ are independently selected from the group consisting of hydroxy, tertiary amino, halo, oxo, cyano, epoxy, carboxyl, alkoxy, alkyl having 1 to 32 carbon atoms, aryl, alkenyl having 2 to 32 carbon atoms, alkynyl having from 2 to 32 carbon atoms, saturated carbocyclic rings having 3 to 14 carbon atoms, unsaturated carbocyclic rings having 4 to 14 carbon atoms, aromatic carbocyclic rings having 6 to 14 carbon atoms, saturated heterocyclic rings having 3 to 14 carbon atoms, unsaturated heterocyclic rings having 3 to 14 carbon atoms and aromatic carbocyclic rings having 6 to 14 carbon atoms; and separating said byproduct from said derived polymer.

2. The process of claim 1 wherein said reagent containing groups X$_a$ comprises nucleophilic reagents.

3. The process of claim 1 wherein said reagent containing groups X$_a$ comprises a compound X—H containing a transferable hydrogen atom and a source of free radicals.

4. The process of claim 1 wherein said reagent containing groups X$_a$ comprises a compound X—H and a source of free radicals.

5. The process of claim 1 wherein at least a stoichiometric amount of said reagent X$_a$ is contacted with said starting polymer.

6. The process of claim 1 wherein said starting polymer is a homopolymer, random, statistical, alternating or gradient copolymer, block polymer, star polymer, graft copolymer, dendritic or hyperbranched copolymer, microgel, or a combination thereof.

7. The process of claim 1 wherein said separating step comprises filtering, solvent extracting, precipitating, flocculating, adsorbing, ion exchanging said byproduct from said derived polymer.

8. The process of claim 2 wherein said $X_a$ is selected from the group consisting of a primary amino, secondary amino, sulfanyl, phosphinyl groups and a combination thereof.

9. The process of claim 3 wherein said reagent containing groups $X_a$ is selected from the group consisting of group (VI) hydrides, hypophosphite salts and hydrogen atom donor solvents.

10. The process of claim 9 wherein said hypophosphite salt is a tetraalkyl ammonium hypophosphite.

11. The process of claim 9 wherein said hypophosphite salt is tetra-butylammonium hypophosphite or 1-ethylpiperidine hypophosphite.

12. The process of claim 4 wherein said reagent containing groups $X_a$ is selected from the group consisting of addition-fragmentation chain transfer agents, disulfides and halocarbons.

13. The process of claim 6 wherein said heat source maintains the process temperature between 180° C. and 300° C.

14. The process of claim 6 wherein said heat source maintains the process temperature between 200° C. and 250° C.

15. The process of claim 1 wherein said $Y_b$ is a reactive, ionic, ionizable group.

16. The process of claim 15 wherein said ionizable group is a tertiary amino group or a carboxyl group.

17. The process of claim 2 wherein in said contacting step said starting polymer is concurrently contacted with a reducing agent selected from the group consisting of a bisulfate salt, a thiosulfate salt, a tertiary phosphine, ascorbic acid, ascorbate salt and a combination thereof.

18. The process of claim 17 wherein said bisulfate salt is $Na_2S_2O_4$.

19. The process of claim 17 wherein said ascorbate salt is sodium ascorbate.

20. The process of claim 17 wherein said tertiary phosphine is tris(2-carboxyethyl)phosphine.

21. The process of claim 2 when the reagent comprises $X_a$ and $Y_b$.

22. The process of claim 3 when the reagent comprises $X_a$ and $Y_b$.

23. The process of claim 4 when the reagent comprises $X_a$ and $Y_b$.

24. The process of claim 22 wherein said reagent is 2-(dimethylamino)ethylamine.

25. The process of claim 1 wherein said derived polymer is in the form of a solution, dispersion, precipitate or a combination thereof.

26. The process of claim 2 wherein said derived polymer has 1 to 6 thiol (—SH) groups.

27. The process of claim 1 wherein said starting polymer has a GPC number average molecular weight in the range of 500 to 100,000.

28. The process of claim 1 wherein said starting polymer has a polydispersity in the range of 1.05 to 3.0.

29. The process of claim 2 wherein said derived polymer has 2 to 6 thiol (—SH) groups.

30. The process of claim 29 further comprising contacting said derived polymer with a di-isocyanate to form polythiourethane.

31. The process of claim 1 wherein said starting polymer is formed by polymerization of a monomer mixture comprising one or more vinyl monomers having the formula:

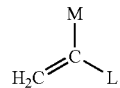

where L is selected from the group consisting of hydrogen, halogen, and substituted or unsubstituted $C_1$-$C_4$ alkyl;

where M is selected from the group consisting of hydrogen, R''', $CO_2H$, $CO_2R'''$, COR''', CN, $CONH_2$, $PO(OR''')_3$, CONHR''', $CONR'''_2$, $O_2CR'''$, OR''', and halogen, wherein R''' is independently selected from the group consisting of substituted or unsubstituted $C_1$-$C_{22}$ alkyl, $C_2$-$C_{22}$ substituted or unsubstituted alkynyl, $C_2$-$C_{22}$ substituted or unsubstituted alkynyl, $C_3$-$C_{22}$ substituted or unsubstituted cycloalkyl, $C_6$-$C_{18}$ substituted or unsubstituted aryl, $C_2$-$C_{18}$ substituted or unsubstituted heterocyclyl, $C_7$-$C_{18}$ substituted or unsubstituted aralkyl, and $C_7$-$C_{18}$ substituted or unsubstituted alkaryl; said substituents being independently selected from the group consisting of hydroxy, OR''', $CO_2H$, $O_2CR'''$, $CO_2R$, '''$C_1$-$C_{22}$ alkyl, $C_6$-$C_{18}$ aryl, =O, $C_6$-$C_{18}$ acyl, $SO_3H$, sulfonate, cyano, $C_3$-$C_{66}$ trialkoxysilyl, $C_3$-$C_{66}$ trialkylsilyl, halo, $C_2$-$C_{44}$ dialkylamino, amido and a combination thereof; and a RAFT agent and a free radical initiator.

32. The process of claim 31 wherein said monomer mix further comprises maleic anhydride, N-alkylmaleimide, N-arylmaleimide, dialkyl fumarate, a cyclopolymerizable monomer, a ring-opening monomer or a combination thereof.

33. The process of claim 31 wherein said RAFT agent is of the formula:

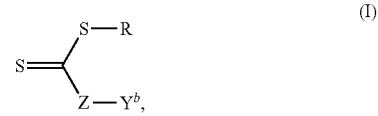

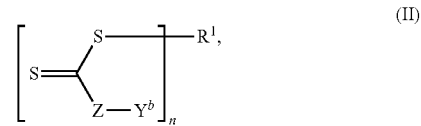

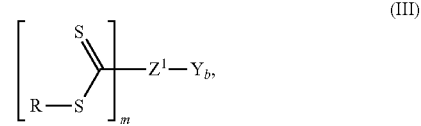

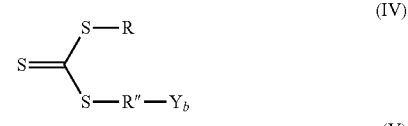

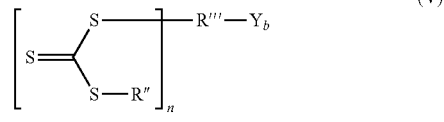

or a combination thereof.

34. The process of claim 33 where the RAFT agent is cyanomethyl 2-carboxyethyl trithiocarbonate.

35. The process of claim 33 where the RAFT agent is cyanomethyl poly(ethylene glycol methyl ether)carboxyethyl trithiocarbonate.

36. The process of claim 33 where the RAFT agent is cyanomethyl 3-(trimethoxysilyl)propyl trithiocarbonate.

* * * * *